United States Patent
Chen et al.

(10) Patent No.: US 10,491,278 B2
(45) Date of Patent: Nov. 26, 2019

(54) WIRELESS COMMUNICATION DEVICE WITH HYBRID BEAMFORMING AND CONTROL METHOD THEREOF

(71) Applicant: Industrial Technology Research Institute, Hsinchu (TW)

(72) Inventors: Chih-Yu Chen, Yilan County (TW); Hsien-Wen Chang, Hsinchu (TW); Jen-Yuan Hsu, Kinmen County (TW); Jan-Shin Ho, Penghu County (TW)

(73) Assignee: Industrial Technology Research Institute, Hsinchu (TW)

( * ) Notice: Subject to any disclaimer, the term of this patent is extended or adjusted under 35 U.S.C. 154(b) by 28 days.

(21) Appl. No.: 15/847,941

(22) Filed: Dec. 20, 2017

(65) Prior Publication Data

US 2019/0190574 A1 Jun. 20, 2019

(30) Foreign Application Priority Data

Dec. 15, 2017 (TW) .............................. 106144067 A

(51) Int. Cl.
  *H04L 5/00* (2006.01)
  *H04B 7/0456* (2017.01)
  *H04B 7/06* (2006.01)
(52) U.S. Cl.
  CPC ......... *H04B 7/0482* (2013.01); *H04B 7/0617* (2013.01); *H04L 5/0053* (2013.01)
(58) Field of Classification Search
  USPC ........................................ 375/267, 316, 219
  See application file for complete search history.

(56) References Cited

U.S. PATENT DOCUMENTS

| 7,877,113 B2 | 1/2011 | Kish et al. |
| 8,686,883 B2 | 4/2014 | Choi et al. |

(Continued)

FOREIGN PATENT DOCUMENTS

| CN | 106063148 | 10/2016 |
| EP | 2824984 | 1/2015 |
| TW | 201628355 | 8/2016 |
| WO | 2009035284 | 3/2009 |
| WO | 2017131566 | 8/2017 |

OTHER PUBLICATIONS

"Office Action of Taiwan Counterpart Application", dated Aug. 3, 2018, p. 1-p. 11.

(Continued)

*Primary Examiner* — Eva Y Puente
(74) *Attorney, Agent, or Firm* — JCIPRNET

(57) ABSTRACT

A wireless communication device with hybrid beamforming and a control method thereof are provided. The wireless communication device includes a plurality of antennas, a beamforming digital circuit, a plurality of radio frequency (RF) chains, a beamforming analog circuit, a controller and a storage. The RF chains receive signals processed by the beamforming digital circuit to generate antenna signals. The RF chains are connected to a part or all of the antennas through the beamforming analog circuit to transmit the antenna signal to the corresponding antennas. The number of the RF chains is smaller than the number of the antennas. The storage stores a plurality of candidate analog codebooks. The controller selects one of the candidate analog codebooks as a selected analog codebook according to scenario or environmental information, and adjusts the beamforming analog circuit according to the selected analog codebook.

15 Claims, 4 Drawing Sheets

(56) References Cited

U.S. PATENT DOCUMENTS

| | | | |
|---|---|---|---|
| 9,008,222 | B2 | 4/2015 | Stirling-Gallacher et al. |
| 9,088,312 | B2 | 7/2015 | Rahman et al. |
| 9,337,973 | B2 | 5/2016 | Hou et al. |
| 9,362,994 | B2 | 6/2016 | Seol et al. |
| 9,667,334 | B2 | 5/2017 | Xi et al. |
| 9,749,158 | B2 * | 8/2017 | Pan ............... H04B 7/0456 |
| 2012/0063494 | A1 * | 3/2012 | Frenne ........... H04B 7/0417 375/219 |
| 2013/0039445 | A1 * | 2/2013 | Hwang ........... H04B 7/0617 375/316 |
| 2013/0301454 | A1 * | 11/2013 | Seol ............... H04B 7/043 370/252 |
| 2014/0334564 | A1 | 11/2014 | Singh et al. |
| 2014/0355707 | A1 * | 12/2014 | Kim ................ H04B 7/0469 375/267 |
| 2015/0365157 | A1 | 12/2015 | Yang et al. |
| 2016/0080051 | A1 * | 3/2016 | Sajadieh ......... H04B 7/0456 375/267 |
| 2016/0353294 | A1 * | 12/2016 | Wang ............. H04B 7/0456 |
| 2017/0134079 | A1 | 5/2017 | Kim et al. |
| 2017/0201309 | A1 | 7/2017 | Kang et al. |
| 2018/0062715 | A1 * | 3/2018 | Li .................... H04B 7/04 |
| 2019/0044756 | A1 * | 2/2019 | Zhao ............... H04B 17/382 |

FOREIGN PATENT DOCUMENTS

OTHER PUBLICATIONS

Song Noh et al., "Multi-Resolution Codebook and Adaptive Beamforming Sequence Design for Millimeter Wave Beam Alignment", Department of Electrical and Computer Engineering Technical Reports, Feb. 2017, pp. 1-15.

Zhenyu Xiao et al., "Hierarchical Codebook Design for Beamforming Training in Millimeter-Wave Communication", IEEE Transactions on Wireless Communications, May 2016, pp. 3380-3392.

Omar El Ayach et al., "Spatially Sparse Precoding in Millimeter Wave MIMO Systems", IEEE Transactions on Wireless Communications, Mar. 2014, pp. 1499-1513.

MD. Saifur Rahman et al., "Low Complexity RF Beam Search Algorithms for Millimeter-Wave Systems", IEEE Global Communications Conference (GLOBECOM), Dec. 2014, pp. 3815-3820.

Ahmed Alkhateeb et al., "Channel Estimation and Hybrid Precoding for Millimeter Wave Cellular Systems", IEEE Journal of Selected Topics in Signal Processing, Oct. 2014, pp. 831-846.

Ahmed Alkhateeb et al., "Frequency Selective Hybrid Precoding for Limited Feedback Millimeter Wave Systems", IEEE Transactions on Communications, May 2016, pp. 1801-1818.

* cited by examiner

WIRELESS COMMUNICATION DEVICE WITH HYBRID BEAMFORMING AND CONTROL METHOD THEREOF

CROSS-REFERENCE TO RELATED APPLICATION

This application claims the priority benefit of Taiwan application serial no. 106144067, filed on Dec. 15, 2017. The entirety of the above-mentioned patent application is hereby incorporated by reference herein and made a part of this specification.

TECHNICAL FIELD

The technical field relates to a wireless communication device with hybrid beamforming and a control method thereof.

BACKGROUND

Beamforming technology, which effectively performs wireless signal transmission by an antenna array, is often applied in wireless communication to achieve the purposes such as enhancement of signal quality, reduction of interference, improvement of transmission efficiency and so on. In a multiple-input multiple-output (MIMO) system with massive antennas (for example, 16, 64 or more antennas), the antenna array may be used to effectively compensate path fading due to distance and to enhance performance of the MIMO system. Such antenna array is conventionally implemented by an all-digital architecture. That is, each antenna in the antenna array requires a digital signal processing circuit corresponding thereto. For example, each antenna generally corresponds to one transmitter (TX) chain, and each TX chain at least includes a variety of high-end circuit elements such as a digital-to-analog converter (DAC), a filter, a power amplifier (PA) and so on. However, these signal processing circuits are of high cost and have higher power consumption.

To reduce the cost of establishing the beamforming technology, in recent hybrid beamforming systems, the signal processing circuits have been transformed from the all-digital form into a mixed structure of analog and digital circuits, in which some circuits (for example, TX chains or other elements) have been reduced in number, thereby reducing the establishment cost. Nevertheless, in the analog circuit, it is difficult to fine-tune a phase shifter and beamforming gain. As a result, in actual operation, the hybrid beamforming system is not as easy to use as a beamforming system implemented by the all-digital architecture. From another point of view, the analog circuit limitations in hybrid beamforming form a very complex non-convex optimization problem to obtain the optimal solution, which is disadvantageous for practical applications.

SUMMARY

Exemplary embodiments of the disclosure provide a wireless communication device with hybrid beamforming and a control method thereof, in which suitable analog codebooks may be adaptively selected and used in different environments and scenarios so as to effectively enhance signal transmission performance.

According to an exemplary embodiment of the disclosure, the proposed wireless communication device includes a plurality of antennas, a beamforming digital circuit, a plurality of radio frequency (RF) chains, a beamforming analog circuit, a controller and a storage. The beamforming digital circuit is configured to process a signal. The RF chains are coupled to the beamforming digital circuit. The RF chains are configured to receive the signal processed by the beamforming digital circuit to generate an antenna signal. The beamforming analog circuit is coupled to the RF chains and the antennas. The RF chains are connected to a part or all of the antennas through the beamforming analog circuit to transmit the antenna signal to the corresponding antennas. The number of the RF chains is smaller than the number of the antennas. The controller is coupled to the beamforming analog circuit. The storage is coupled to the controller. The storage stores a plurality of candidate analog codebooks. The controller selects one of the candidate analog codebooks as a selected analog codebook according to scenario or environmental information, and adjusts the beamforming analog circuit according to the selected analog codebook.

According to an exemplary embodiment of the disclosure, there is proposed a control method of a wireless communication device with hybrid beamforming. The wireless communication device includes a plurality of antennas, a beamforming digital circuit, a plurality of radio frequency (RF) chains, and a beamforming analog circuit. The control method includes the following steps. A plurality of candidate analog codebooks are designed and generated via offline simulations. One of the candidate analog codebooks is selected as a selected analog codebook according to scenario or environmental information. In addition, the beamforming analog circuit is adjusted according to the selected analog codebook.

Based on the above, in the wireless communication device with hybrid beamforming and the control method thereof according to exemplary embodiments of the disclosure, a candidate analog codebook having better transmission efficiency is selected from a plurality of candidate analog codebooks according to the scenario or environmental information (for example, access state, deployment environment of the wireless communication device, or characteristics of propagation channel), and the beamforming analog circuit is adjusted using this analog codebook. In other words, conventional wireless communication devices with hybrid beamforming generally include only single analog codebook, and cannot adjust by themselves the beamforming analog circuit adaptively to different environments and different situations. In contrast, in the wireless communication device according to an exemplary embodiment of the disclosure, a variety of preset digital codebooks and candidate analog codebooks are respectively generated by a beamforming algorithm by pre-simulating a plurality of scenarios, situations (for example, access state and deployment environment of the wireless communication device), and dynamic characteristics of propagation channel. Accordingly, the wireless communication device may adaptively select and use suitable digital codebooks and analog codebooks in different scenarios or environments, thereby effectively enhancing the signal transmission performance.

Several exemplary embodiments accompanied with figures are described in detail below to further describe the disclosure in details.

DETAILED DESCRIPTION OF DISCLOSED EMBODIMENTS

In a beamforming system, beams in a plurality of different directions may be formed by an antenna array, and the width of the beams may be adjusted by a signal processing circuit. A wireless communication device (for example, a base station or a user device) with the beamforming system may accurately and stably transmit information through these beams, thereby enhancing signal strength and transmission coverage. Beamforming systems may be divided into two types, all-digital and hybrid, according to the type of the signal processing circuit thereof. An all-digital beamforming system requires costly hardware for implementation thereof. In this way, the all-digital beamforming system may have the most freedom of operation; that is, a digital circuit may be used to easily adjust weighted values and parameters of each element, and a conventional beamforming algorithm is also applicable. The all-digital beamforming system is often used in Long-Term Evolution (LTE, or 4G) or WiFi technology.

Figure 1:
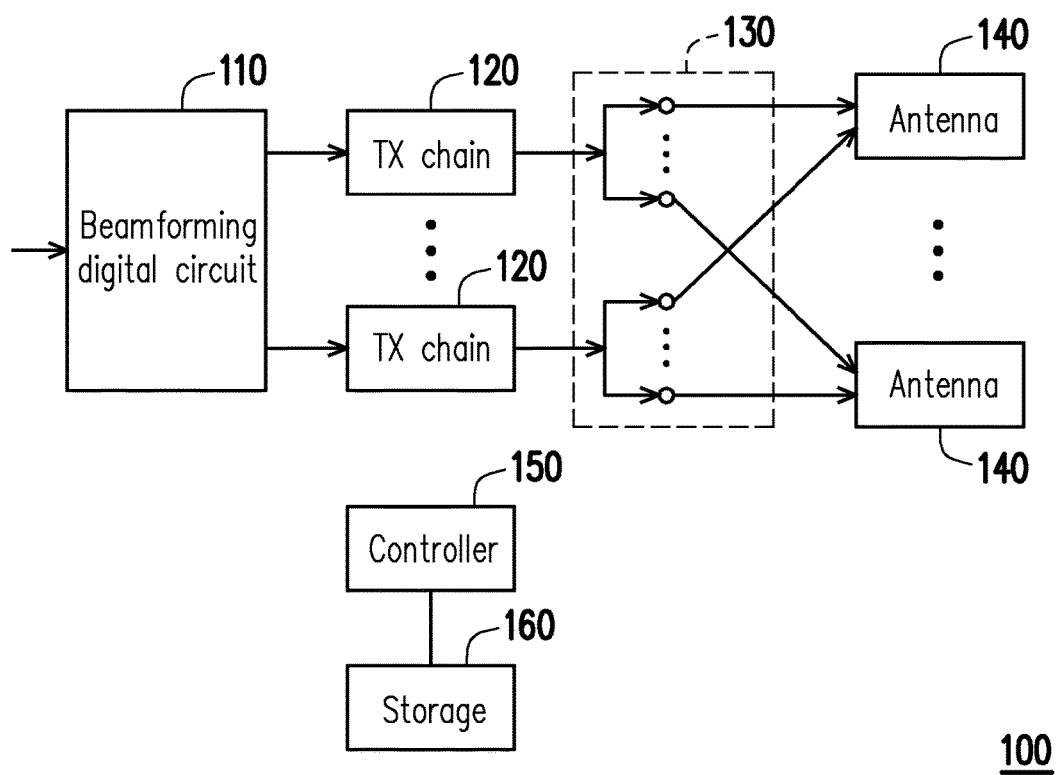
FIG. 1 is a schematic diagram of a wireless communication device according to an exemplary embodiment of the disclosure.

The hybrid beamforming system is usually applied in a wireless communication device 100, and a signal processing part thereof is divided into a digital terminal part (digital circuit) and an analog terminal part (analog circuit). FIG. 1 is a schematic diagram of the wireless communication device 100 according to an exemplary embodiment of the disclosure. As shown in FIG. 1, the wireless communication device 100 with hybrid beamforming mainly includes a beamforming digital circuit 110, a plurality of radio frequency (RF) chains (implemented by transmitter (TX) chains 120 in the present embodiment), a beamforming analog circuit 130, a plurality of antennas 140, a controller 150 and a storage 160. The storage 160 is coupled to the controller 150. The beamforming analog circuit 130 is coupled to the RF chains (TX chains 120) and the antennas 140. The wireless communication device 100 of the present embodiment is implemented by a base station in a wireless communication system for exemplary purposes. Nevertheless, persons who apply the present embodiment may implement the disclosure in a user device. From another point of view, the beamforming digital circuit 110, the RF chains, the beamforming analog circuit 130 and the controller 150 may belong to baseband signal processing apparatuses of a communication transmitter.

The beamforming digital circuit 110 is configured to process a signal to generate a processed signal. In the present embodiment, each of the TX chains 120 may include elements such as a device with digital pre-distortion (DPD), a digital-to-analog converter (DAC), a filter, a power amplifier (PA), a mixer and so on. In conventional beamforming technologies, each of the antennas 140 corresponds to one TX chain 120. Since the cost of the TX chains 120 is very high, the hybrid beamforming system uses the beamforming analog circuit 130 to reduce the number of the TX chains 120. In other words, the TX chains 120 are connected to a part or all of the antennas 140 through the beamforming analog circuit 130, so that an antenna signal generated by the TX chains 120 is transmitted to the corresponding antennas 140. The number of the TX chains 120 will be smaller than the number of the antennas 140.

The beamforming analog circuit 130 may include analog circuit elements such as a phase shifter, an amplifier and so on. The beamforming analog circuit 130 of the present embodiment mainly includes a plurality of phase shifters. The wireless communication device 100 may adjust related parameters of the phase shifters using a preset analog codebook. Since the main function of the phase shifters is to shift a phase of an input signal and the phase shifters belong to the analog circuit, there are only a fixed number of ways of adjusting a shift amount of the phase shifters. In other words, in a wireless communication device in accordance with hybrid beamforming, a nonlinear limitation formed by the analog circuit 130 may disturb an optimum selection in the beamforming algorithm. For example, vibration amplitudes of the phase shifters in the analog circuit 130 are all fixed numerical values, and the phase shift amount of the phase shifters can only be selected from a small number of phase shift amounts.

Herein, digital codebooks and analog codebooks are described. Digital codebooks are mainly applied in a digital precoder in a multi-antenna system having the all-digital architecture. The digital precoder performs operations on amount of vector space that may occur, beamforming criteria, and several characteristics of propagation channel to form a limited number of combinations of data, and performs the beamforming algorithm offline to form a plurality of weighted values for adjusting the digital circuit. In some exemplary embodiments in accordance with the disclosure, the digital codebook may be obtained by performing calculations using a simulator in accordance with the beamforming algorithm and storing results of the calculations into the beamforming system. A set formed by these weighted values is called a digital codebook, and the set may be presented as a plurality of matrices.

In the wireless communication system, the precoders of both a receiving end device and a transmitting end device have a plurality of digital codebooks prepared corresponding to different signal transmission scenarios. The precoder of the receiving end device searches for the best codebook among the established candidate digital codebooks and transmits it back to the transmitting end device. Thus, there is no need for the transmitting end device and the receiving end device to calculate each weighted value in the digital circuit or adjust the related parameters in real-time by the beamforming algorithm during a signal transmission process. Instead, the above adjustments may be achieved directly using the preset digital codebooks. Accordingly, an overall real-time operation amount of the beamforming system can be reduced.

In the hybrid beamforming system of the present embodiment, the storage 160 not only stores a plurality of preset digital codebooks for the controller 150 to make adjustments to the beamforming digital circuit 110, but also stores a plurality of preset analog weight codebooks (also referred to as analog codebooks) for the controller 150 to make adjustments to the beamforming analog circuit 130. The functions of the analog codebooks are similar to those of the digital codebooks. The precoder in the hybrid beamforming system may pre-store a single preset analog codebook to set weighted values of each element of the analog circuit 130, so as to reduce operation complexity of the beamforming system. The analog codebook may also be obtained by performing calculations using an external simulator in accordance with the beamforming algorithm (that is, the external simulator is not located within the wireless communication device 100) and storing results of the calculations into the wireless communication device 100. Since the analog codebooks can be stored and simulated offline, a real-time operation using the beamforming algorithm is not required. Moreover, the weighted values may be obtained by pre-simulation so as to precisely adjust each element in the analog circuit, better codebooks can be obtained considering the nonlinear limitations of the elements in the analog circuit. The "nonlinear limitations" mentioned herein refer to, for example, cases where the vibration amplitude of the phase shifter is a fixed value, the phase shift amount of the phase shifter is limited to only a few choices and cannot be arbitrarily adjusted, and so on. A difference between the analog codebooks and the digital codebooks lies in that, conventional hybrid beamforming systems generally include only single analog codebook, and this analog codebook may perform optimization only for one specific scenario (for example, optimization of a characteristic of propagation channel, or reduction of steps of beam training).

However, in actual application of the beamforming technology to the wireless communication device 100, depending on different application scenarios and environments, other problems may need to be considered in order to optimize signal processing. For example, when the wireless communication device 100 is in an initial access scenario, it is required that a beam sweeping process be completed within a certain period of time and that the user device in the wireless communication system achieve a certain detection rate so as to ensure the coverage of the base station. When the wireless communication device 100 is in a connected mode scenario, it is required that the hybrid beamforming system performs optimization for an environment with certain location distributions and mobile behaviors of the user devices. Therefore, the analog codebook required by the hybrid beamforming system in the wireless communication device 100 can adapt according to the environments and scenarios.

Accordingly, in an exemplary embodiment of the disclosure, a plurality of candidate analog codebooks are designed for different scenarios and environments, so that the wireless communication device 100 can adaptively select and use suitable analog codebooks in the different scenarios and environments, thereby effectively enhancing signal transmission performance. In detail, the controller 150 in FIG. 1 selects one of the candidate analog codebooks stored in the storage 160 as a selected analog codebook according to scenario or environmental information, and adjusts the beamforming analog circuit 130 according to the selected analog codebook.

Figure 2:
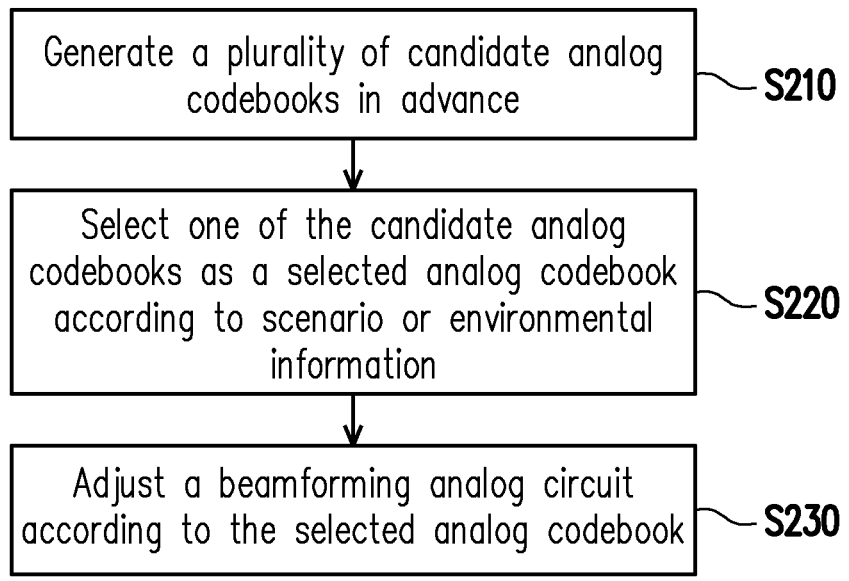
FIG. 2 is a flowchart showing steps of a control method of a wireless communication device with hybrid beamforming according to an exemplary embodiment of the disclosure.

FIG. 2 is a flowchart showing steps of a control method of a wireless communication device with hybrid beamforming according to an exemplary embodiment of the disclosure. Referring to FIG. 1 and FIG. 2 together, in step S210, the wireless communication device 100 generates a plurality of candidate analog codebooks offline and stores the candidate analog codebooks in the storage 160. In step S220, the controller 150 in the wireless communication device 100 selects one of the candidate analog codebooks as the selected analog codebook according to the scenario or environmental information. In step S230, the controller 150 adjusts the beamforming analog circuit 130 according to the selected analog codebook. Please refer to FIG. 3 for detailed steps of step S220.

Figure 3:
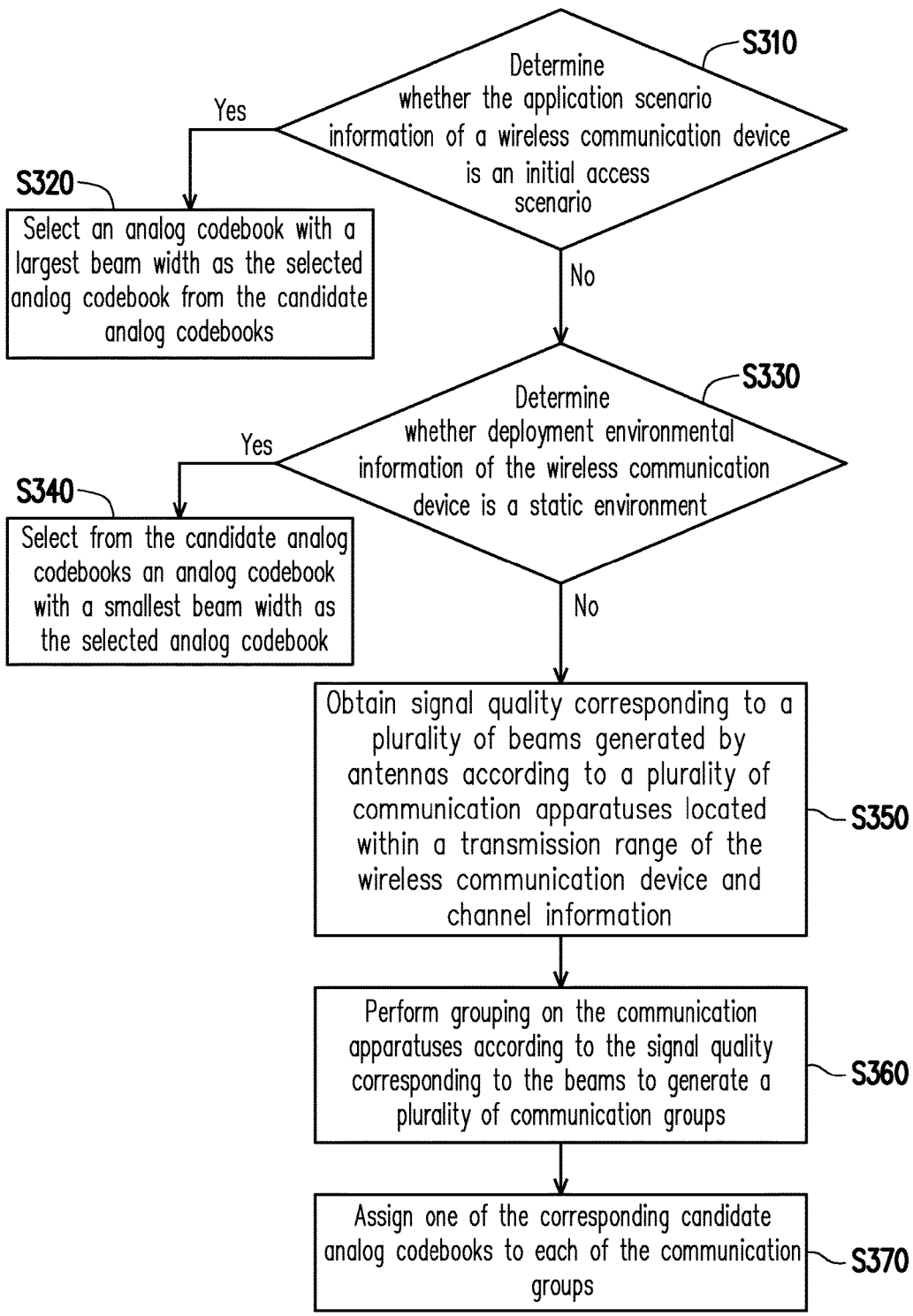
FIG. 3 is a detailed flowchart of step S220 in FIG. 2.

FIG. 3 is a detailed flowchart of step S220 in FIG. 2. The scenario or environmental information as mentioned in the present embodiment mainly includes application scenario information, deployment environmental information, and channel information (for example, measured data of channel characteristics for wireless communication). Hereinafter, description is given of how the wireless communication device selects a corresponding and suitable analog codebook according to different types of scenario or environmental information. In step S310, the controller 150 determines whether the application scenario information of the wireless communication device 100 is the initial access scenario or the connected mode scenario. When the application scenario information is the initial access scenario, the process goes from step S310 to step S320, in which the controller 150 selects an analog codebook with a largest beam width as the selected analog codebook from the candidate analog codebooks.

Figure 4:
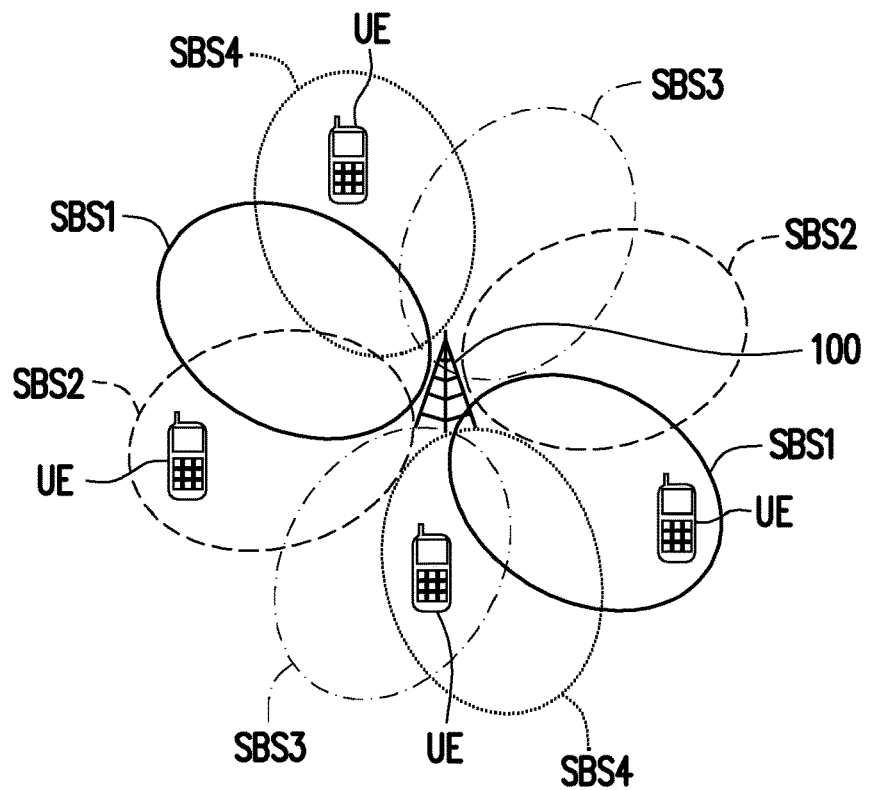
FIG. 4 is a schematic diagram of a wireless communication device in an initial access scenario.

In detail, FIG. 4 is a schematic diagram of the wireless communication device 100 in the initial access scenario. FIG. 4 indicates that in the initial access scenario, the wireless communication device 100 (for example, a base station) needs to scan a plurality of communication apparatuses (for example, user devices UE) within its transmission range. Thus, the wireless communication device 100 requires a use of a plurality of wide beams to reduce the time required for beam sweeping. The wide beams are, for example, wide beams SBS1 to SBS4 in FIG. 4. The wide beams SBS1 to SBS4 of the present embodiment are beams with the largest width that the antenna 140 in the wireless communication device 100 is capable of generating. Meanwhile, the wide beams SBS1 to SBS4 may extend in two directions at the same time, thereby expanding the area covered by the transmission range of the beams.

In another aspect, when the application scenario information of the wireless communication device 100 (base station) is the connected mode scenario, the controller 150 further determines whether a beam used by the user device UE is a wider beam (suitable for the user device UE in a dynamic environment) or a narrower beam (suitable for the user device UE in a static environment) according to the deployment environmental information of the wireless communication device 100. The so-called "deployment environmental information" refers to preset numerical values set by a setting person when setting up the wireless communication device 100 (base station), and may be divided into static environment and dynamic environment.

Figure 5:
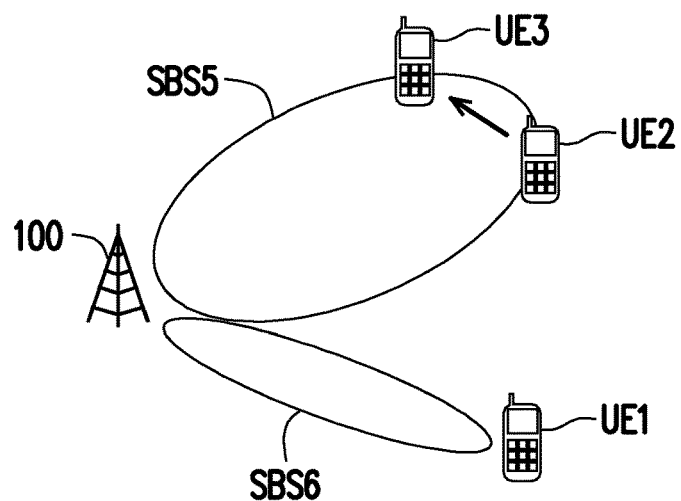
FIG. 5 is a schematic diagram of a wireless communication device and a user device in a static environment and a dynamic environment.

FIG. 5 is a schematic diagram of the wireless communication device 100 and the user device UE in the static environment and the dynamic environment. In other words, during deployment of a base station, whether the environment of the base station is a dynamic environment (for example, or static environment) may be determined. Referring to FIG. 3 and FIG. 5 together, in step S330, the wireless communication device 100 determines whether the deployment environmental information of the wireless communication device is a static environment (indoors, a shopping mall, or a stadium). When the deployment environmental information is the static environment, a user device (for example, a user device UE1) within the transmission range of the wireless communication device 100 (base station) is generally with low moving speed. At this moment, when a beam with a wider beam width is used to transmit information, the speed at which signals are transmitted to the user device UE1 and accuracy of the signal transmission may be lowered. In another aspect, in the static environment, the user device UE1 normally does not move outside an area of a configured beam SBS6. Thus, when the deployment environmental information is the static environment, the process goes from step S330 to step S340, in which the wireless communication device 100 (base station) selects an analog codebook with a smallest beam width as the selected analog codebook from the candidate analog codebooks. Accordingly, the wireless communication device 100 (base station) may use a beam (for example, beam SBS6) with the smallest width to transmit information to the user device UE1, so as to obtain the best signal transmission effects.

In contrast, when the deployment environmental information is a dynamic environment (for example, a general outdoor environment, or an environment adjacent to a freeway or a railroad), a user device usually moves at high speed. For example, the user device moves from the position of the user device UE2 to the position of the user device UE3. On this occasion, it is necessary to track the motion of the user device for the controller 150 to dynamically select the best analog codebook to adjust the beamforming analog circuit 130, such that the motion path of the user device can be covered by a beam (for example, beam SBS5) with a larger width. Accordingly, in an exemplary embodiment of the disclosure, how to dynamically detect a relationship between the wireless communication device 100 and a user device (namely, communication apparatus) so as to dynamically select the best analog codebook is described in detail with reference to the following steps S350 to S370.

Referring to FIG. 3, in step S350, according to the channel information returned from a plurality of communication apparatuses (user devices) located within the transmission range of the wireless communication device 100, the controller 150 obtains signal quality corresponding to each of the communication apparatuses at a plurality of beams. The beams are generated by the antennas 140. The "channel information" and "signal quality" mentioned herein may include one or a combination of signal-to-interference-plus-noise ratio (SINR), signal-to-noise ratio (SNR), received signal strength indicator (RSSI), reference signal received quality (RSRQ), reference signal received power (RSRP) and distance between the wireless communication device and the communication apparatuses.

The controller 150 may obtain the signal quality corresponding to a beam in many implementation manners. One implementation manner is as follows. The controller 150 may first control the beamforming digital circuit 110, the RF chain 120 and the beamforming analog circuit 130 to respectively transmit a downlink pilot signal (also referred to as a downlink channel pilot signal) in different beams within a fixed period of time. Each of the communication apparatuses within the transmission range of the wireless communication device 100 separately measures strength of the downlink pilot signal transmitted in each of the beams, and returns the measurement results to the controller 150 of the wireless communication device 100. The controller 150 performs grouping on the communication apparatuses according to the measurement results returned from each of the communication apparatuses and corresponding to each of the beams, so as to generate a plurality of communication groups.

Another implementation manner is as follows. The communication apparatuses within the transmission range of the wireless communication device 100 respectively transmit an uplink pilot signal (also referred to as an uplink channel pilot signal) in different beams. The controller 150 separately measures strength of the uplink pilot signal transmitted in the beams, calculates a difference factor of each of the communication apparatuses at the beams using the measurement results returned from the communication apparatuses and corresponding to each of the beams, and performs grouping on each of the communication apparatuses using the difference factor of each of the communication apparatuses and at least one group threshold value. Such implementation manner is applicable to a case where downlink and uplink channels have reciprocity. The downlink pilot signal or the uplink pilot signal of the present embodiment may be implemented by a channel state information reference signal (CSI-RS) and a sounding reference signal (SRS). The "measurement result" mentioned above may refer to reference signal received power (RSRP) of the downlink pilot signal or the uplink pilot signal.

Referring back to step S360 in FIG. 3, according to the signal quality corresponding to each of the communication apparatuses at each of the beams, the controller 150 performs grouping on the communication apparatuses to generate a plurality of communication groups. How to perform the grouping on the communication apparatuses using the measurement results is herein described. Here, it is assumed that a plurality of communication apparatuses are provided, each of the communication apparatuses is assigned a number u, and the total number of the beams is M, wherein u and M are both positive integers. The controller 150 calculates the difference factor of each of the communication apparatuses at the beams according to the measurement results of all the beams (namely, $RSRP_{u,1}$ to $RSRP_{u,M}$ of the downlink pilot signal/uplink pilot signal in each of the beams). The "difference factor" mentioned in the present embodiment may refer to a variance or standard deviation of $RSRP_{u,1}$ to $RSRP_{u,M}$. Herein, a variance $\sigma_u^2$ of $RSRP_{u,1}$ to $RSRP_{u,M}$ is used as the "difference factor" of the present embodiment. Then, the controller 150 performs grouping on the communication apparatuses using a plurality of preset group threshold values $G_1$ to $G_{q-1}$. The number of the communication groups is set to q herein, and q is a positive integer. For example, when $\sigma_1^2$ is smaller than the group threshold value $G_1$, a first communication apparatus is classified into a first communication group; when $\sigma_i^2$ is greater than or equal to the group threshold value $G_1$ and smaller than the group threshold value $G_2$, an i-th communication apparatus is classified into a second communication group (wherein i is a positive integer smaller than or equal to q), and the rest may be deduced by analogy. Accordingly, the controller 150 may perform grouping on each of the communication apparatuses using the preset group threshold values $G_1$ to $G_{q-1}$ and the difference factor.

In step S370, the controller 150 assigns one of the corresponding candidate analog codebooks to each of the communication groups. Accordingly, the controller 150 may communicate with the communication apparatuses using the corresponding candidate analog codebook assigned to the communication group as the selected analog codebook. The magnitude of the difference factor of each of the communication apparatuses reflects how often or how actively each of the communication apparatuses crosses or moves between the beams, according to which different beam widths are provided to the communication apparatuses that move to different extents. That is, with respect to a communication apparatus that moves actively, the controller selects an analog codebook that may form a wider beam; in contrast, with respect to a communication apparatus that does not frequently mover, the controller selects an analog codebook that may form a narrow beam.

It should be noted that the order of some steps in FIG. 3 may be re-ordered depending on actual application needs. For example, the order of steps S310 and S330 may be switched; alternatively, steps S350 to S370 may be executed first, and then the determination in steps S310 and S330 is executed.

In summary, in the wireless communication device with hybrid beamforming and the control method thereof according to exemplary embodiments of the disclosure, a candidate analog codebook having better transmission efficiency is selected from a plurality of candidate analog codebooks according to the scenario or environmental information (for example, access state, deployment environment of the wireless communication device, or characteristics of propagation channel), and the beamforming analog circuit is adjusted using this analog codebook. In other words, conventional wireless communication devices with hybrid beamforming generally include only single analog codebook, and cannot adjust by themselves the beamforming analog circuit adaptively to different environments and different situations. In contrast, in the wireless communication device according to an exemplary embodiment of the disclosure, a variety of preset digital codebooks and candidate analog codebooks are respectively generated by a beamforming algorithm by pre-simulating a plurality of scenarios and situations (for example, access state and deployment environment of the wireless communication device) and dynamic characteristics of propagation channel. Accordingly, the wireless communication device may adaptively select and use suitable digital codebooks and analog codebooks in different scenarios or environments, thereby effectively enhancing the signal transmission performance.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A wireless communication device comprising:
a plurality of antennas;
a beamforming digital circuit configured to process a signal;
a plurality of radio frequency chains coupled to the beamforming digital circuit and configured to receive the signal processed by the beamforming digital circuit to generate an antenna signal;
a beamforming analog circuit coupled to the radio frequency chains and the antennas, wherein the radio frequency chains are connected to a part or all of the antennas through the beamforming analog circuit to transmit the antenna signal to the corresponding antennas, wherein a number of the radio frequency chains is smaller than a number of the antennas;
a controller coupled to the beamforming analog circuit; and
a storage coupled to the controller and storing a plurality of candidate analog codebooks,
wherein the controller selects one of the candidate analog codebooks as a selected analog codebook according to scenario or environmental information, and adjusts the beamforming analog circuit according to the selected analog codebook,
wherein the scenario or environmental information comprises deployment environmental information of the wireless communication device,
the controller determines whether the deployment environmental information of the wireless communication device is a static environment, and
when the deployment environmental information is the static environment, the controller selects a candidate analog codebook with a smallest beam width as the selected analog codebook from the candidate analog codebooks.

2. The wireless communication device as claimed in claim 1, wherein the scenario or environmental information further comprises application scenario information of the wireless communication device,
the controller determines whether the application scenario information of the wireless communication device is an initial access scenario, and
when the application scenario information is the initial access scenario, the controller selects a candidate analog codebook with a largest beam width as the selected analog codebook from the candidate analog codebooks.

3. The wireless communication device as claimed in claim 1, wherein the scenario or environmental information further comprises channel information,
according to the channel information returned from a plurality of communication apparatuses located within a transmission range of the wireless communication device, the controller obtains signal quality corresponding to each of the communication apparatuses at a plurality of beams, wherein the beams are generated by the antennas, and
according to the signal quality corresponding to each of the communication apparatuses at the beams, the controller further performs grouping on the communication apparatuses to generate a plurality of communication groups, and assigns one of the corresponding candidate analog codebooks to each of the communication groups.

4. The wireless communication device as claimed in claim 3, wherein the controller controls the beamforming digital circuit, the radio frequency chains and the beamforming analog circuit to respectively transmit a downlink pilot signal in the beams different from one another, and
according to measurement results returned from each of the communication apparatuses corresponding to all the beams, the controller performs the grouping on the communication apparatuses to generate the communication groups.

5. The wireless communication device as claimed in claim 4, wherein the controller calculates a difference factor of each of the communication apparatuses at the beams using the measurement results returned from each of the communication apparatuses corresponding to all the beams, and performs the grouping on each of the communication apparatuses using the difference factor of each of the communication apparatuses and at least one group threshold value.

6. The wireless communication device as claimed in claim 3, wherein the communication apparatuses respectively transmit an uplink pilot signal in the beams different from one another, and
the controller separately measures strength of the uplink pilot signal transmitted in the beams, and performs the grouping on the communication apparatuses to generate the communication groups according to measurement results for the strength of the uplink pilot signal transmitted in the beams.

7. The wireless communication device as claimed in claim 3, wherein the channel information comprises one or a combination of signal-to-interference-plus-noise ratio (SINR), signal-to-noise ratio (SNR), received signal strength indicator (RSSI), reference signal received quality (RSRQ), reference signal received power (RSRP) and distance between the wireless communication device and the communication apparatuses.

8. The wireless communication device as claimed in claim 1, wherein the storage further stores a plurality of candidate digital codebooks, and
the controller selects one of the candidate digital codebooks to adjust the beamforming digital circuit.

9. A control method of a wireless communication device with hybrid beamforming, the wireless communication device comprising a plurality of antennas, a beamforming digital circuit, a plurality of radio frequency chains, and a beamforming analog circuit, the control method comprising:
generating a plurality of candidate analog codebooks via offline simulations;
selecting one of the candidate analog codebooks as a selected analog codebook according to scenario or environmental information; and
adjusting the beamforming analog circuit according to the selected analog codebook,
wherein the scenario or environmental information comprises deployment environmental information of the wireless communication device, and
the step of selecting one of the candidate analog codebooks as the selected analog codebook according to the scenario or environmental information comprises:
determining whether the deployment environmental information of the wireless communication device is a static environment, and
when the deployment environmental information is the static environment, selecting from the candidate analog codebooks a candidate analog codebook with a smallest beam width as the selected analog codebook.

10. The control method as claimed in claim 9, wherein the scenario or environmental information further comprises application scenario information of the wireless communication device, and
the step of selecting one of the candidate analog codebooks as the selected analog codebook according to the scenario or environmental information comprises:
determining whether the application scenario information of the wireless communication device is an initial access scenario; and
when the application scenario information is the initial access scenario, selecting from the candidate analog codebooks a candidate analog codebook with a largest beam width as the selected analog codebook.

11. The control method as claimed in claim 9, wherein the scenario or environmental information further comprises channel information, and
the step of selecting one of the candidate analog codebooks as the selected analog codebook according to the scenario or environmental information comprises:
according to the channel information returned from a plurality of communication apparatuses located within a transmission range of the wireless communication device, obtaining signal quality corresponding to each of the communication apparatuses at a plurality of beams, wherein the beams are generated by the antennas;
according to the signal quality corresponding to each of the communication apparatuses at the beams, performing grouping on the communication apparatuses to generate a plurality of communication groups; and
assigning one of the corresponding candidate analog codebooks to each of the communication groups.

12. The control method as claimed in claim 11, wherein the step of obtaining signal quality corresponding to each of the communication apparatuses at a plurality of beams according to the channel information returned from a plurality of communication apparatuses located within a transmission range of the wireless communication device comprises:
according to the measurement results returned from each of the communication apparatuses corresponding to all the beams, performing the grouping on the communication apparatuses to generate the communication groups.

13. The control method as claimed in claim 12, wherein the step of performing the grouping on the communication apparatuses according to the measurement results to generate the communication groups comprises:
calculating a difference factor of each of the communication apparatuses using the measurement results returned from each of the communication apparatuses corresponding to all the beams; and
performing the grouping on each of the communication apparatuses using the difference factor of each of the communication apparatuses and at least one group threshold value.

14. The control method as claimed in claim 11, wherein the step of obtaining signal quality corresponding to each of the communication apparatuses at a plurality of beams according to the channel information returned from a plurality of communication apparatuses located within a transmission range of the wireless communication device comprises:
measuring strength of an uplink pilot signal transmitted in the beams to generate measurement results, wherein the uplink pilot signal is transmitted respectively by the communication apparatuses in the beams different from one another; and
performing the grouping on the communication apparatuses according to the measurement result to generate the communication groups.

15. The control method as claimed in claim 11, wherein the channel information comprises one or a combination of signal-to-interference-plus-noise ratio, signal-to-noise ratio, received signal strength indicator, reference signal received quality, reference signal received power and distance between the wireless communication device and the communication apparatuses.

* * * * *